UNITED STATES PATENT OFFICE.

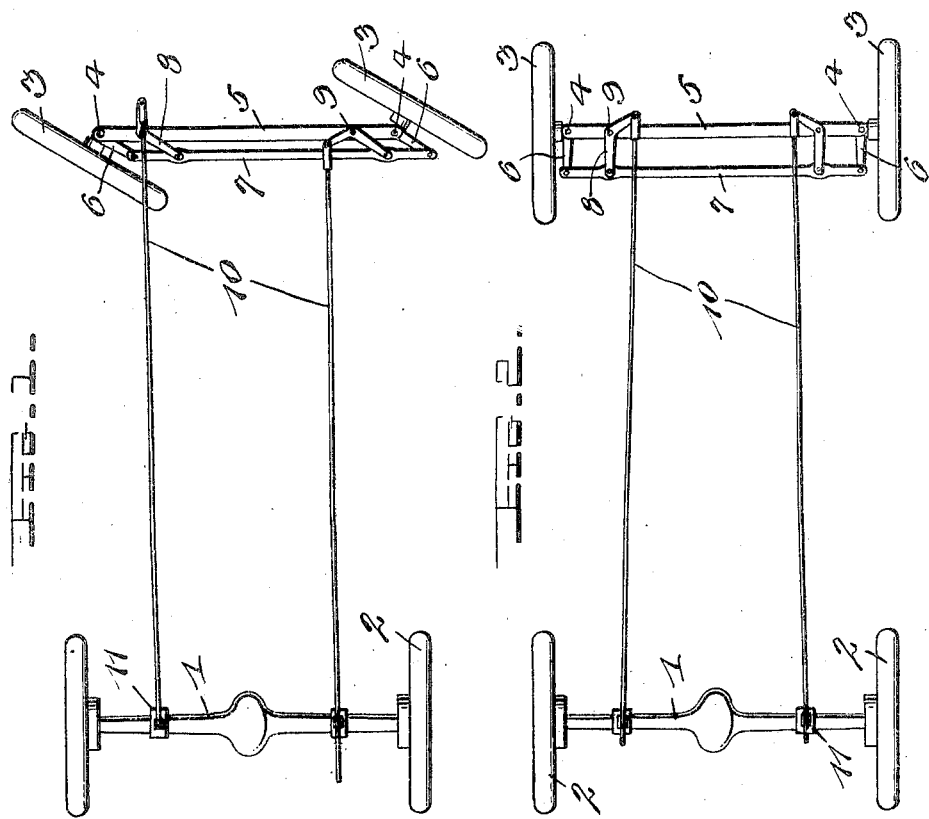

FABRICIO de ALBA B, OF PANAMA, PANAMA.

SELF-PROPELLED VEHICLE.

1,082,457.  Specification of Letters Patent.  Patented Dec. 23, 1913.

Application filed September 6, 1912, Serial No. 718,894. Renewed November 7, 1913. Serial No. 799,800.

*To all whom it may concern:*

Be it known that I, FABRICIO DE ALBA B. a citizen of the Republic of Panama, residing at Panama, have invented certain new and useful Improvements in Self-Propelled Vehicles, of which the following is a specification, reference being had to the accompanying drawings.

This invention comprehends certain new and useful improvements in automobiles or other self-propelled vehicles, and the invention has for its primary object a simple and efficient means whereby either one of the rear traveling or ground wheels of the vehicle may be retarded or brought entirely to a standstill, whereby it may serve as the pivot or axis upon which the vehicle may be turned, and the invention consists in certain constructions, arrangements and combinations of the parts that I shall hereinafter fully describe and claim.

For a full understanding of the invention, reference is to be had to the following description and accompanying drawing, in which, Figure 1 is a plan view of the principal parts of my improved self-propelled vehicle with the mechanism in position to turn said vehicle, said view showing the front wheels turned to proper position to guide the vehicle to the left. Fig. 2 is a view similar to Fig. 1, showing the parts of the mechanism in normal position and the spindles for the front wheels in alinement with the front axle.

Corresponding and like parts are referred to in the following description and designated in the accompanying drawing by like reference characters.

Referring to the drawing, the numeral 1 designates the rear axle housing of an automobile or similar self-propelled vehicle, 2 the rear ground or traveling wheels, and 3 the front ground wheels which are mounted to turn to the right or to the left in the usual manner, to steer the vehicle, the said wheels being journaled on spindles which are pivotally connected, as indicated at 4, to the ends of the transversely extending frame bar 5. The steering mechanism is not illustrated, as it of itself forms no part of the present invention.

The spindle for each front wheel 3 is provided with a rearwardly projecting arm 6 which, in the present instance, extends parallel to the plane of the wheel, said arms being pivotally connected at their rear ends to a transversely extending link bar 7. The link bar 7 is connected, preferably near its ends, to corresponding arms of bell cranks 8 which are fulcrumed at their elbows, as indicated at 9, on the frame bar 5, the other arms of the respective bell cranks being pivotally connected to brake actuating rods 10 arranged in any suitable manner to operate the brakes 11 for the respective rear ground or traveling wheels 2.

From the foregoing description in connection with the accompanying drawing, the operation of my invention will be apparent. The bell cranks 8 are arranged in oblique relation to each other, as clearly illustrated in the drawing, and hence, when the front wheels 3 are turned to the right or to the left, to steer the vehicle, it is obvious that one of the rods 10 will be pulled forwardly to set the brake on one of the wheels 2, while the other rod 10 will be moved rearwardly to release the brake on the other rear wheel. The wheel on which the brakes are set is the wheel constituting the center of the turning movement of the vehicle, and consequently, said wheel will be retarded or brought to a standstill while the other rear wheel will be permitted to accelerate its speed a corresponding amount, owing to the differential in the rear axle housing 1. It will thus be seen that I have provided very simple and efficient mechanism whereby the brake will be set on one rear wheel and not the other, according to the direction in which the vehicle is being steered, the simplicity of the devices employed rendering the invention easily applicable for self-propelled vehicles of widely varying types.

While the accompanying drawing illustrates what I believe to be the preferred embodiment of my invention, it is to be understood that the invention is not limited thereto, nor to any construction of brake mechanism by itself, and that various changes may be made in the construction, arrangement and proportions of the parts without departing from the scope of the invention, as defined in the appended claim.

What I claim is:—

The combination with a vehicle, embodying rear ground wheels having independent brakes and front steering wheels, a frame bar to which the front and steering wheels are connected, rearwardly projecting arms movable with said wheels to the right and to the left, a link bar pivotally connected to said arms, bell cranks fulcrumed on the frame bar and having their rear arms pivotally connected to the link bar, and brake actuating rods pivotally connected to the other arm of the bell cranks and to the brakes, as and for the purpose set forth.

In testimony whereof I hereunto affix my signature in the presence of two witnesses.

FABRICIO de ALBA B.

Witnesses:
WM. CALEY JOHNSTON,
MARIE PRECIADO.

Copies of this patent may be obtained for five cents each, by addressing the "Commissioner of Patents, Washington, D. C."